(No Model.) 2 Sheets—Sheet 1.
R. FAWCETT.
SHIFTING SEAT FOR VEHICLES.
No. 484,414. Patented Oct. 18, 1892.
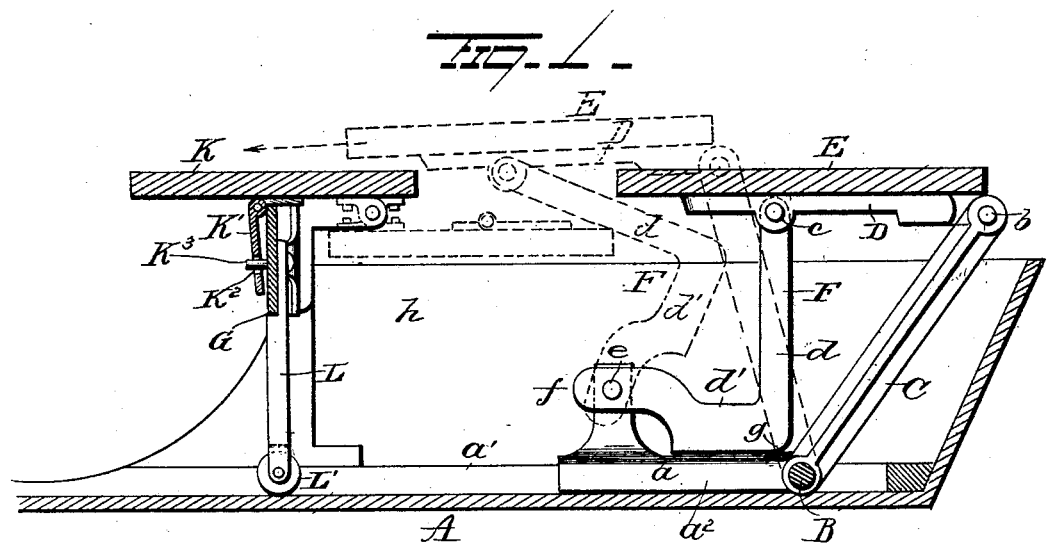
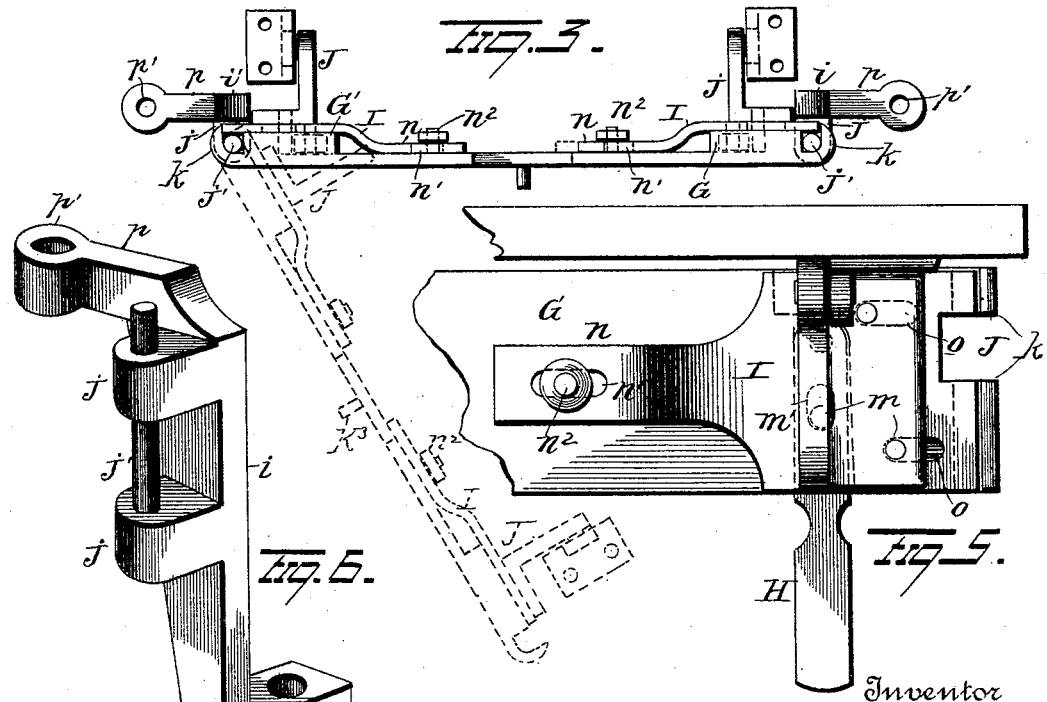
Witnesses
E. J. Nottingham
G. F. Downing
Inventor
R. Fawcett
By H. A. Seymour
Attorney
THE NORRIS PETERS CO., PHOTO-LITHO., WASHINGTON, D. C.

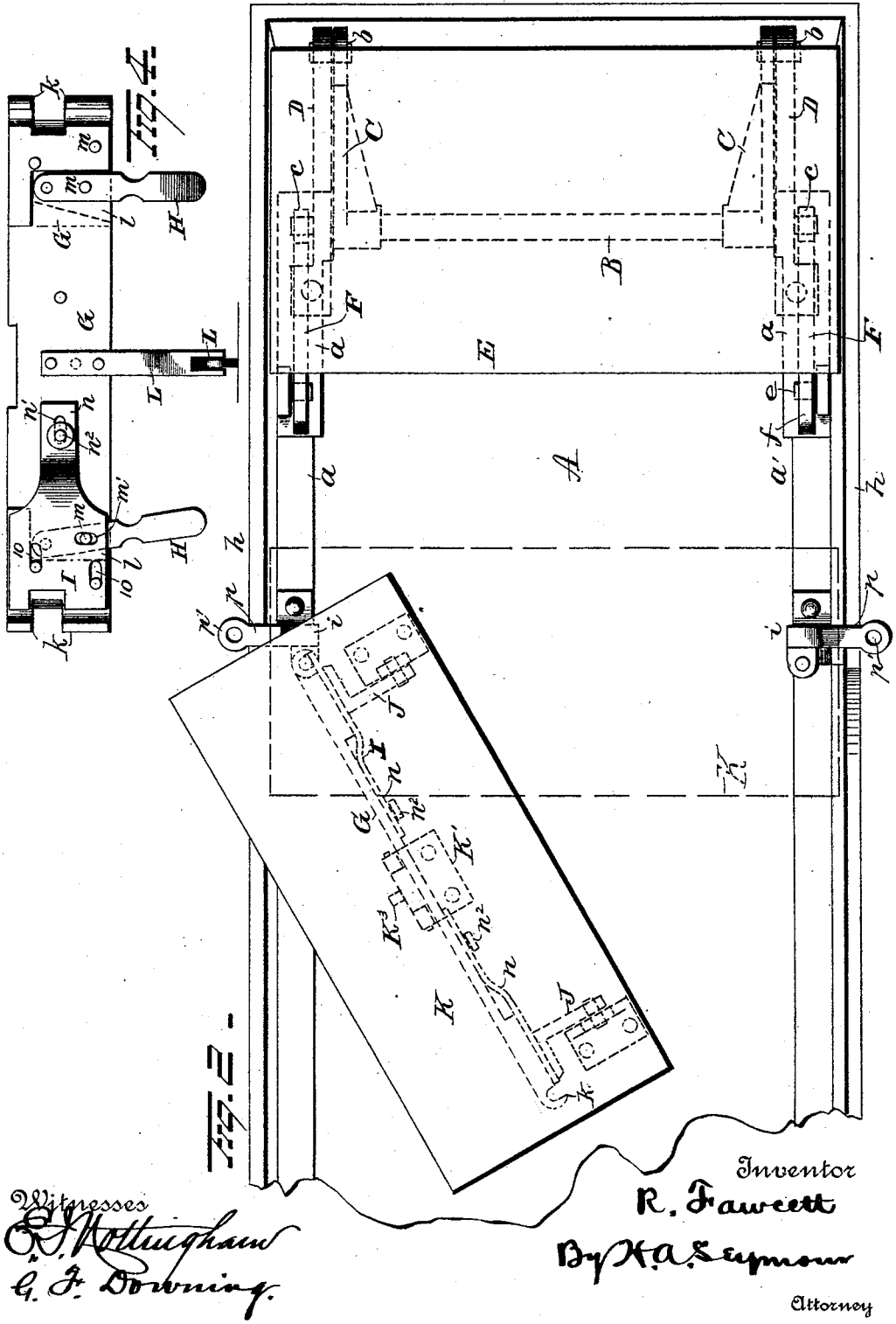

UNITED STATES PATENT OFFICE.

RICHARD FAWCETT, OF SALEM, OHIO.

SHIFTING SEAT FOR VEHICLES.

SPECIFICATION forming part of Letters Patent No. 484,414, dated October 18, 1892.

Application filed November 6, 1891. Serial No. 411,062. (No model.)

*To all whom it may concern:*

Be it known that I, RICHARD FAWCETT, a resident of Salem, in the county of Columbiana and State of Ohio, have invented certain new and useful Improvements in Shifting Seats for Vehicles; and I do hereby declare the following to be a full, clear, and exact description of the invention, such as will enable others skilled in the art to which it appertains to make and use the same.

My invention relates to an improvement in seats for carriages, and more particularly to shifting seats, the object of the invention being to construct a jump-seat in such manner that the seat shall be firm and steady and so that lateral motion of the seat shall be prevented.

A further object is to construct a front seat for a vehicle in such manner that it may be rigid and so that it may be swung out in either direction to permit the admission of persons to the vehicle from either side.

A further object is to produce improved jump or shifting seats which shall be simple in construction, cheap to manufacture, and effectual in the performance of its functions.

With these objects in view the invention consists in certain novel features of construction and combinations and arrangements of parts, as hereinafter set forth, and pointed out in the claims.

In the accompanying drawings, Figure 1 is a longitudinal sectional view of a vehicle having my improvements applied thereto. Fig. 2 is a plan view of the same. Figs. 3, 4, 5, and 6 are detached views of the several parts.

A represents a vehicle-body, in the bottom of which, near its rear end, two plates $a\ a$ are secured, said plates being preferably located on the sills $a'$ of the frame of the vehicle-body and are made with depending flanges $a^2$. Journaled at its ends in the depending flanges $a^2$ is a shaft B, to which upwardly-extending arms C are secured. The upper ends of the arms C are provided with perforations, through which pins $b$ pass, said pins also passing through perforations in the rear ends of plates D, secured to the under face of the rear seat E. The arms D extend from the rear edges of the seat E to points in proximity to the front edge of said seat and at or near their forward ends are provided with perforated bosses $c$ for the reception of pivot-pins whereby to pivotally connect arms or legs F to said plates D.

The arms or legs F are each composed of two arms $d\ d'$, projecting from each other at right angles and the lower end of the arm or section $d'$ bent or extended somewhat forwardly and downwardly and provided at a point near its lower end with a perforation for the reception of a pivot-pin $e$, whereby to pivotally connect said arms or legs to a lug or projection $f$, extending upwardly from the plates $a\ a$. When the rear seat is in its rearward extremity, the portions $d'$ of the arms or legs F are adapted to rest on the plates $a\ a$ or a flange or enlargement $g$ on said plates. By thus mounting the rear seat it will be rigid when adjusted in position, will operate easily when thrown to its forward position, as hereinafter described, and lateral displacement and binding of the seat will be prevented. By curving the lower part $d'$ of the arms or supports F, as above described, and pivotally connecting them at points somewhat higher than the pivotal connection of the arms C the seats of the vehicle may be folded compactly and obviate to some extent the great amount of "overhang," as found in some similar constructions.

Secured to the side boards $h$ of the vehicle-body are two posts or standards $i\ i'$, each of said posts or standards being provided with bosses $j$, which support a short rod $j'$, said rod projecting somewhat above the upper boss $j$ of each post or standard. Extending from one post or upright $i\ i'$ is a plate or board G, provided at its ends with curved lips K, adapted to receive the pins or short rods $j'$. Also secured to or made integral with the plate or board G, near each end, is a plate G', having a V-shaped recess $l$ therein, and pivoted to the plate or board G, within this recess, is a lever H, which projects below the plate or board to produce a handle, from the face of which a pin $m$ projects. A sliding lock-plate I is placed against each plate G' and is provided with an elongated slot $m'$ for the reception of the pin $m$. A curved or bent spring-arm $n$ projects inwardly from each sliding lock-plate I and provided at their inner ends with elongated slots $n'$ for the reception of pins or bolts $n^2$, whereby to connect them to the plate or board G. Placed against the sliding plates I are brackets J, having one arm perforated for the reception of fastening devices, said fastening devices passing through elongated slots *o* in the sliding plate I and into the plate G'. The other arm of the brackets J is hinged to the front seat K at or near its rear edge. The hinged seat K is provided on its bottom with a hinged plate K', having a perforation K$^2$, adapted to receive a pin or projection K$^3$ on the front face of the plate or board G. In this manner the seat may be locked in position. The posts or standards *i i'* may be provided with laterally-projecting arms *p*, having perforations *p'* for the reception of canopy-posts.

When it is desired to employ but one seat, the front seat K is first hinged back, or, in other words, it is turned upside down on its hinges, and the rear seat thrown forward, the arm or portions *d* of the arms or supports F resting parallel with the front seat.

In order to facilitate the admission of persons to the vehicle when the front seat is in use, the said front seat may be swung around from either end by simply operating one of the levers H to withdraw the sliding plate I and then swinging the seat around by the hinged connection of the plate G with the post *i* at the other end. It is evident that the reverse of this can be equally well accomplished, whereby the seat may be swung in the opposite direction.

In order to properly support the front seat while it is being swung around, a post L is secured to the plate or board G and provided at its lower end with a roller L', adapted to run on the floor of the vehicle.

Having fully described my invention, what I claim as new, and desire to secure by Letters Patent, is—

1. The combination, with a vehicle and bearings permanently located at the sides of the vehicle, of a seat connected with the bearings in such a manner that it may be swung outwardly from the bearing at either side of the vehicle, substantially as set forth.

2. The combination, with a vehicle, of posts secured to the sides thereof, and a seat connected with said posts in such manner that it may be swung outwardly from either post, substantially as set forth.

3. The combination, with a vehicle, of posts secured thereto, a plate connected with said posts, whereby said plate may be swung outwardly from either post, and a seat hinged to said plate, substantially as set forth.

4. The combination, with a post or standard and a pin supported thereby, of a plate having a lip to engage said pin, a sliding lock-plate adapted to prevent the disengagement of the first-mentioned plate from said pin, and a pivoted lever adapted to operate said sliding lock-plate to release the first-mentioned plate from the post, and a seat carried by said plate, substantially as set forth.

5. The combination, with a post, of the plate hinged thereto, a leg secured to said plate, a roller carried by the leg, and a seat hinged to said plate, substantially as set forth.

6. The combination, with a post, of a plate hinged thereto, brackets projecting from said plate, a seat hinged to said brackets, and a plate adapted to lock the seat in position, substantially as set forth.

7. The combination, with a vehicle-body, of posts secured thereto, said posts having arms for the reception of canopy-posts, and a seat removably connected with said posts, substantially as set forth.

In testimony whereof I have signed this specification in the presence of two subscribing witnesses.

RICHARD FAWCETT.

Witnesses:
R. P. TRIMBLE,
B. E. TRIMBLE.